United States Patent Office 2,891,978
Patented June 23, 1959

2,891,978
METHOD FOR THE MANUFACTURE OF DEEP BLACK COLORING MATTER CONTAINING IRON URUSHIOLATE AND PRODUCT THEREOF

Kaichi Ohashi, Osaka, Japan

No Drawing. Application September 18, 1956
Serial No. 610,651

8 Claims. (Cl. 260—439)

The present invention relates to a method for the preparation of a deep black coloring matter whose principal constituent is iron urushiolate or its condensation product, and more particularly to a coloring matter for imparting a deep black color to paints, varnishes and lacquers, printing inks, printing pastes, printing pigments and molded products of synthetic resin and the like as well as applications of the aforesaid method.

An object of this invention is to provide a coloring matter from urushiol at low cost, which exhibits a refined highly transparent, deep black and a black color like oriental lacquer.

Another object of this invention is to provide a coloring matter having excellent physical and chemical properties that urushiol possesses inherently and being completely free from the skin affecting poison of urushiol.

A further object of the invention is to provide a coloring matter having a good miscibility with various synthetic resins and whose color phase, tone and concentration can be adjusted by admixing with some carbon black or some dyestuff.

A still further object of the invention is to provide a coloring matter for imparting a deep black color to paints, varnishes and lacquers, especially printing paints, printing inks, printing pastes, printing pigments or molded products of synthetic resin.

Other objects, features and advantages of this invention will be apparent from the following detailed descriptions.

Red, yellow and green colors impart instantaneous artistic stimulus to man and the deepest color is black, which is unanimously acknowledged by all.

Thus, it has long been taken as a step for making every-day life richer from ancient time to use black color in clothes or furniture. However, with development of man's sense of color, he has become unsatisfied with a mere black color and desires to add a refined luster to this color.

It is oriental lacquer that has appeared to meet the above requirements. The oriental lacquer is not merely black, but also exhibits a complex delicate color with various mixed shades of light, which permits an extended viewing without losing interest therein. Thus, the art of oriental lacquer has shown an extended stride of development. This is a matter to which attention should be paid from the world's artistic point of view.

Oriental lacquer is tree juice or sap which is obtained from *Rhus vernicifera*, D.C. grown on fields and mountains in Japan and China. This *Rhus vernicifera*, D.C. is a kind of deciduous forest tree having small elliptic leaves of 10–15 cm. in length. The tree grows to about 10 meters in height. When the tree age of the *Rhus vernicifera*, D.C. is about 8 to 10 years old, the oriental lacquer may be extracted from its trunk by scratching the trunk over the months of June to November. The composition of this oriental lacquer differs depending on the land of origin, the time of extraction and the scratching position of the *Rhus vernicifera*, D.C., but its general composition may be shown as follows:

| | Percent |
|---|---|
| Urushiol | 55 |
| Gummy matter | 9 |
| Nitrogen-containing organic substance | 3 |
| Moisture | 33 |
| Total | 100 |

Thus, the oriental lacquer is composed of 55% urushiol as a principal constituent and 45% of the remaining constituents.

A method for separating the above-mentioned constituents may be effected as follows:

A crude oriental lacquer is first dried to remove water, and after complete dehydration, this crude lacquer is divided into a portion soluble in an absolute alcohol and another portion insoluble in the alcohol. Furthermore, the insoluble portion is divided into a portion soluble in water and another portion insoluble in water. The process can be indicated as follows:

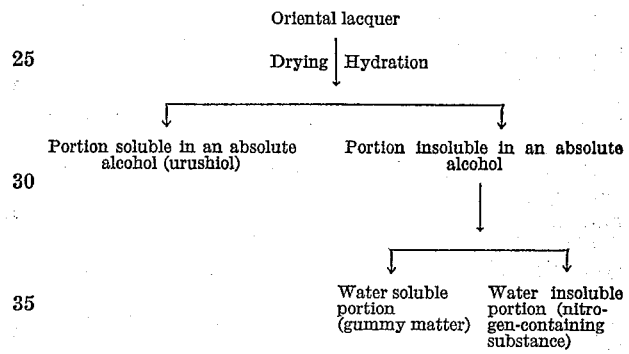

The nitrogen-containing substance contains a laccase which imparts the property for drying said lacquer thereto.

Further reference may be had to the following literature which deals with the chemical content of oriental lacquers: T. Ishimatsu, Mem. of Manchester Library and Philosophical Soc., 1882, vol 3, 249; H. Yoshida, Chemical Study of Oriental Lacquers, (I) Tōka, 5, 1–47, 1884, (II) Tōka, 5, 91–137, 1884; K. Miyama, Report on Study of Principal Constituents of Oriental Lacquers, Tōka, 27, 1191–1202, 1906; The Principal Constituent of Oriental Lacquer and Method for Testing Quality of Said Lacquer, Tōka, 10, 107–124, 1907; R. Majima, Untersuchungen über den Japanlack, 1924.

Nevertheless, as the oriental lacquer is costly, it is quite regrettable that it can not be used in abundance for general applications, excepting for artistic articles.

The present inventor thought deeply that, if a pigment exhibiting a true black color like oriental lacquer can be produced at low cost, not only the paint industry but also the printing industry, synthetic resin industry and the like would be given a considerable contribution thereby, and thus has conducted exhaustive experiments with paints for many years and as a result, the present invention has been completed by combining chemically urushiol with iron to produce iron urushiolate.

The present invention is characterized in that iron, or ferrous or ferric compound, of chemical equivalent to urushiol or in excess thereof, is added to urushiol, i.e. a principal constituent of oriental lacquer (crude lacquer and refined lacquer are herein referred to generally as oriental lacquer or simply lacquer), and the resulting mixture is heated to cause iron to combine with urushiol to form iron urushiolate, after which the iron urushiolate thus obtained is dissolved in a solvent, for instance, solvent naphtha to obtain a required coloring matter. The present invention also involves another process for obtaining a coloring matter, wherein iron or iron compound of less than its chemical equivalent to urushiol is caused to react with the aforementioned urushiol to form iron urushiolate, and mono-hydric phenols, such as cresol, phenol, xylenol and the like and an addition product of hexamethylenetetramine are then added to the iron urushiolate thus formed; the mixture is treated to effect condensation suitably under heating, and thereafter the thus obtained substance is dissolved in a solvent to obtain the coloring matter.

The term "coloring matter" used hereinafter covers a coloring matter exhibiting a deep black color, which includes as a principal constituent iron urushiolate obtained by reacting urushiol with iron of chemical equivalent to urushiol, or in excess thereof, and another coloring matter exhibiting a deep black and urushi-black color, which includes a principal constituent obtained by having urushiol combine chemically with iron of less than its chemical equivalent and then causing the compound thus obtained to effect condensation with an addition product of hexamethylenetetramine and of phenols. The coloring matter thus produced according to this invention has the following features:

(1) This coloring matter is in a position to exhibit a refined, highly transparent and extremely deep color; no other pigments nor dyestuffs can be paralleled thereto;

(2) This coloring matter can retain urushiol's excellent properties, even if it is mixed with other substances, without lowering physical and chemical behaviors of urushiol;

(3) No skin affecting poison of lacquer is liable to appear, because said poison has completely been removed;

(4) It has a good miscibility with various types of synthetic resin and its color phase, tone and concentration can suitably be adjusted by adding some carbon black or some oil-soluble dyestuff thereto such as an oil color having a nigrosine base.

The principal constituent of crude oriental lacquer produced in Japan, Korea and China is urushiol as represented by a formula: $C_6H_3(OH)_2C_{15}H_{27}$ or $C_{21}H_{32}O_2$; further it includes laccol from French Indo-China having a principal constituent of crude lacquer designated by a formula $C_6H_3(OH)_2C_{17}H_{31}$ (1:2:3) or $C_{23}H_{36}O_2$ and thitsiol from Burma, having a principal constituent of crude lacquer indicated by a formula: $C_6H_3(OH)_2C_{17}H_{31}$ (1:2:4) or $C_{23}H_{36}O_2$, as well as renghol from Java, a principal constituent of crude lacquer represented by a formula: $C_6H_3(OH)_2C_{15}H_{29}$ (1:2:3) or $C_{21}H_{34}O_2$. However, it will be shortly referred to hereinafter, for the sake of simplicity, as "urushiol."

In the following description, the reaction mechanism for the reaction between the urushiol and iron according to the invention will be explained.

The iron or iron compound to be combined with urushiol in the present invention can be, as described hereinbefore, iron powder, ferrous compound or ferric compound, for instance, ferrous acetate, ferrous hydroxide, ferric hydroxide and the like. Iron powder takes a long period of time for its reaction; but ferrous acetate, especially pyrolignite of iron reacts easily with urushiol and is stable. This pyrolignite of iron is most favorable because of its low price.

The combination of this urushiol with iron is shown as follows:

(a) In the case of divalent iron (Fe··),

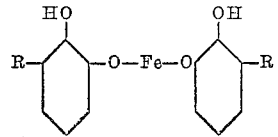

where R is $C_{15}H_{27}$.

(b) In the case of trivalent iron (Fe···),

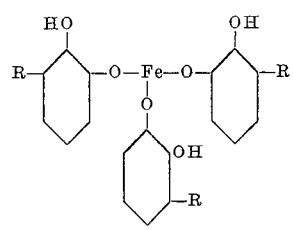

In the case where it is heated after iron is further added to it:

($a_1$) In the case of divalent iron (Fe··),

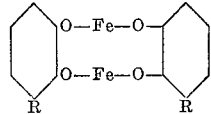

where R is $C_{15}H_{27}$.

However, with iron powder, as no above-said reaction occurs, $Fe(OH)_2$ or iron acetate is used. When iron acetate is used, it is necessary to heat to dehydration and at the same time expel acetic acid.

($b_1$) In the case of trivalent iron (Fe···),

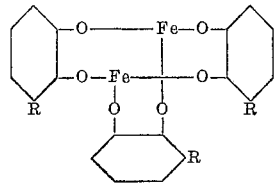

where R is $C_{15}H_{27}$.

The chemical equivalents corresponding to the chemical reaction between urushiol and iron to be used in this case will be apparent from the aforesaid constructional formula of iron urushiolate. That is, in the case where a ferrous salt, i.e. a divalent iron (Fe··) is used:

(1) As shown by the aforesaid Formula 1, when iron links with only one of the OH-groups in two molecules of urushiol, one iron atom to two molecules of urushiol is the chemical equivalent.

For instance, in case an 18° Bé. solution of pyrolignite of iron is used as ferrous salt, 1,000 grams of this solution contains 60.56 grams of iron (Fe). Hence, 146 grams of pyrolignite of iron to 100 grams urushiol is the chemical equivalent stoichiometrically;

(2) As given by the aforementioned Formula 3, when iron links with two OH-groups in two molecules of urushiol, two iron atoms to two urushiol molecules are the chemical equivalent.

For instance, in this case 292 grams of pyrolignite of iron to 100 grams of urushiol is the chemical equivalent. In case ferric salt, i.e. trivalent iron (Fe‴) is used, (1) As shown by the aforesaid Formula 3, when iron links with only one of the two OH-groups in two molecules of urushiol, one molecule of iron is required for three molecules of urushiol;

(2) As referred to in Formula 4, when iron (Fe) links respectively with all OH-groups in two molecules of urushiol, two atoms of iron are required for three molecules of urushiol.

Thus, in the method according to the present invention, in order to obtain the desired iron urushiolate, iron of chemical equivalent to urushiol or in excess thereof can be used, based on the aforementioned chemical equivalence. The addition product to be brought into condensation with a compound as already described, which is obtained by using iron of less than its chemical equivalent to urushiol, may be easily obtained by adding hexamethylenetetramine to monohydric phenol, such as phenol, cresol, xylenol and the like, heating the mixture thus obtained at a temperature ranging from 70° C. to 85° C. to dissolve it and then allowing it to cool. For instance, if 3 mols of phenol is added to 1 mol of hexamethylenetetramine, crystals of hexamethylenetetramine-triphenol can be obtained easily. In addition, if 2 mols of m-cresol are added to 1 mol of hexamethylene tetramine, crystals of hexamethylenetetramine-di-m-cresol can be obtained.

Further, the aforesaid addition product in the present invention, is efficient in improving properties of paints and accordingly may be used whenever needed.

The coloring matter which is prepared by the process of this invention has an extremely excellent characteristic of exhibiting a deep black color in paint, varnish and lacquer, printing ink, pigment, printing paste, synthetic resin, molded product of synthetic resin and the like, and can be advantageously used as their base material. For instance, said coloring matter can be used for the above-mentioned purposes, by mixing with carbonaceous pigments whose principal constituent is carbon, such as carbon black, lamp black and ivory black, or natural or artificial bituminous matter, such as gilsonite or petroleum pitch, or black dyestuff or its like.

Besides, the coloring matter can also be used for purposes as shown, by way of example, in the following manner:

(a) The desired baking paints or resinous paints can be prepared by mixing with various kinds of synthetic resins in accordance with the usages of paints to be obtained;

(b) It can be mixed with a solvent, such as solvent naphtha or Cellosolve to prepare photogravure printing ink;

(c) Resin molded matter having various deep black colors can be produced, when mixed with primary condensation products of urea with formaldehyde, melamine with formaldehyde, cellulosine or mixed with polyvinylchloride;

(d) Besides, ebonite and black printing paste for textile fabrics and the like can be manufactured.

The invention is further described in the following examples, which are illustrative but not limitative thereof.

Example 1

In the case where iron urushiolate alone was the principal constituent, 10,000 grams of 18° Bé. solution of pyrolignite of iron was mixed with 6,000 grams of crude oriental lacquer (containing 55% of urushiol) and boiled and dehydrated. Finally, complete dehydration was effected by heating to a temperature of 120 to 130° C. Then, 2,500 grams of a solvent naphtha was added to the resulting product as solvent and the mixture was then filtered for removing gummy substance contained in the crude lacquer (a substance extremely resembling Arabian gum) and other foreign materials. Thus, 6,600 grams of finished product containing 68% of iron urushiolate was obtained. (This product is simply referred to as "A.")

Example 2

4,200 grams of 18° Bé. solution of pyrolignite of iron was mixed with 6,000 grams of crude lacquer (55% urushiol) and then treated similarly as in Example 1. Then, 1,000 grams of hexamethylenetetramine di-m-cresol was added to the product and heated to 120 to 130° C. to condense it. The condensation product thus produced was then added with 3,500 grams of a solvent naphtha as solvent and filtered at 70 to 80° C. to remove foreign substances. Thereafter, the filtrate was heated again up to 70 to 80° C. and filtered like in Example 1, because if the filtrate cools down, its viscosity will rise and it becomes pasty, which makes filtration hard. Thus, 6,500 grams of finished product (68% non-volatile matter) was given. (This product is named B.)

*Composition of product.*—The compositions of products (A) and (B) obtained in the aforesaid Examples 1 and 2 are as below:

|  | (A), Percent | (B), Percent |
|---|---|---|
| Urushiol | 57.8 | 55.6 |
| Iron content | 10.2 | 4.1 |
| Hexamethylenetetramine-di-methacresol |  | 8.3 |
| Solvent | 32.0 | 32.0 |
| Total | 100.0 | 100.0 |

The application examples of the coloring matter according to the present invention will now be explained as follows:

(a) Example of producing an extremely excellent black baking paint—

Raw materials are mixed as follows:

|  | Kg. |
|---|---|
| The aforesaid coloring matter (B) obtained by the method of the invention | 52.21 |
| Oily varnish (66% non-volatile matter) | 28.6 |
| Petroleum solvent | 9.6 |
| Solvent naphtha | 9.6 |
| Total | 100.0 |

The baking varnish thus obtained is deep black having refined lustre and a film can be formed by baking, having high resistance to water, acid and solvent, and a remarkably high electrical insulating property. A baking temperature of 160° C. will permit a perfect hardening in thirty minutes.

(b) Example of producing a baking paint having high weather resistant black—

Raw materials are mixed as follows:

|  | Kg. |
|---|---|
| The coloring matter (A) prepared according to the process of this invention | 42.5 |
| Medium oil alkyd resin modified with melamine resin (nonvolatile matter 55%) | 44.8 |
| Solvent naphtha | 12.7 |
| Total | 100.0 |

When the paint thus obtained is applied on goods and baked at 140° C. for 40 minutes, the paint is then hardened and there is obtained a beautiful deep black film having high resistance against water and chemicals.

The medium oil alkyd resin modified with melamine resin used in this example is a mixture in which melamine-formaldehyde condensate modified with butanol and medium oil alkyd resin are contained at a rate of 100 parts to 150 parts.

(c) Example of low temperature baking paint—

Raw materials are mixed as follows:

|  | Kg. |
|---|---|
| Coloring matter according to the present invention (A) | 10.0 |
| Short oil alkyd resin modified with melamine resin (non-volatile matter 55%) | 93.0 |
| Solvent naphtha | 5.0 |
| Total | 108.0 |

Thus obtained paint is characterized in that it can be baked at low temperatures and is hardened by baking at 120° C. for 40 minutes.

The medium oil alkyd resin modified with melamine resin being used in this example is a mixture which is mixed at a ratio of 200 parts of short oil alkyd resin to 100 parts of melamine-formaldehyde condensation product modified with butanol.

(d) Example of low price black baking paint—

Raw materials are mixed as follows:

| | Kg. |
|---|---|
| Coloring matter of this invention (B) | 18.8 |
| Medium oil alkyd resin (non-volatile matter 60%) | 68.9 |
| Solvent naphtha | 12.3 |
| Total | 100.0 |

The paint thus obtained is of low price and an excellent weather resistant baking paint and can be hardened perfectly at 170° C. for about 40 minutes.

(e) Example of black silicoresin paint—
Raw materials are mixed as follows:

| | Kg. |
|---|---|
| Coloring matter of the present invention (B) | 52 |
| Trimethyl silanol (60% non-volatile matter) | 36 |
| Solvent naphtha | 12 |
| Total | 100 |

Thus obtained paint hardens perfectly when baked at 180° C. for 40 to 60 minutes. In addition, a film from this paint is particularly excellent in the resistance against water and heat as well as rich in electric insulating property.

(f) Example of black ethoxy-resin paint—
Raw materials are mixed as follows:

| | Kg. |
|---|---|
| Coloring matter of this invention | 42 |
| Ethoxy resin (non-volatile matter 60%) | 40 |
| Melamine resin (trimethylol-melamine-butylether) (non-volatile matter 60%) | 10 |
| Solvent naphtha | 8 |
| Total | 100 |

The paint thus produced can be hardened by baking at 170° C. for 40 to 60 minutes. It has a considerably high adhesive power.

(g) Example of gravure printing ink—
Raw materials are mixed as follows:

| | Kg. |
|---|---|
| Coloring matter of this invention (A) or (B) | 45.9 |
| Solvent naphtha | 32.9 |
| Cellosolve | 21.4 |
| Total | 100.0 |

The ink thus obtained exhibits a beautiful black color and its tone of black color is, as compared with ink prepared with carbon black, characterized in that the tone of black color is uniform, because no variation of color tone due to partial irregularity of color shade appears on the resulting printed surface.

(h) Example of the manufacture of urea resin molded product or melamine resin molded product (both of those products are deep black resin moldings)—
Raw materials are mixed as follows:

| | Kg. |
|---|---|
| Primary condensation product of urea-formaldehyde (or primary condensation product of melamine formaldehyde) | 100 |
| Cellulosine (wood fiber powder) | 100 |
| Coloring matter of this invention (A) | 40 |
| Ammonium chloride (hardening agent) | 2 |
| Stearic acid | 1 |
| Total | 243 |

Formaldehyde is mixed with urea at the ratio 1.5 mol to 1 mol and the mixture is then heated at a pH of 7.5–8.0. After the condensation, it then undergoes concentration under reduced pressure, whereby 25 to 30% of water are removed. Thus, primary condensation product of urea-formaldehyde is obtained.

Formaldehyde is mixed with melamine at the ratio of 3 mols to 1 mol and the mixture is treated as before. Thus, primary condensation product of melamine formaldehyde is obtained.

The resin thus obtained is mixed respectively with above-mentioned raw material under hot rolling, dried at a low temperature under reduced or normal pressure, then finely pulverized and shaped with addition of ammonium chloride.

(i) Example of phenol-formaldehyde resin molded product—

| | Kg. |
|---|---|
| Primary condensation product of phenol-formaldehyde (for raw materials) | 100 |
| Cellulosine wood powder | 100 |
| Coloring matter (A) or (B) of this invention | 40 |
| Stearic acid | 1 |
| Total | 241 |

1.5 mols of formaldehyde is added to 1 mol of phenol or m-cresol and the mixture obtained is subjected to condensation under heating with addition of small amount of ammonium as a catalyst, and a part of water contained in the condensation product thus obtained is then removed. This is such a condensation product that was used as above-named primary condensation product of phenol-formaldehyde. This condensation product is then mixed with above-named raw materials under hot rolling, dried at low temperatures under reduced or normal pressure, then finely pulverized and shaped into a desired form.

Thus, a beautiful deep black product which has never been seen in an ordinary Bakelite can be obtained.

(j) Example of black vinylchloride resin molded product—

| | Kg. |
|---|---|
| Poly-vinylchloride (polymerization degree: 800) | 100 |
| Coloring matter (A) or (B) of this invention | 20 |
| Total | 120 |

(k) Example of ebonite—

| | Kg. |
|---|---|
| Raw material smoke sheet | 100 |
| Reclaimed rubber | 125 |
| Ebonite powder | 175 |
| Coloring matter (A) of the invention | 25 |
| Magnesia | 5 |
| Sulphur | 80 |
| Total | 510 |

A mixture of the aforesaid recipe is mixed under heating, and thereafter, a generally known process is followed. Thus, a deep black ebonite is obtained. The product possesses additional properties of oriental lacquer. Its property is an improved one.

(l) Example of black printing paste for textile fabrics—

| | Kg. |
|---|---|
| Crude lacquer (urushiol 55%) | 400 |
| Pyrolignite of iron 80° Bé. | 160 |
| Hexamethylenetetramine-trixylenol | 75 |
| Solvent naphtha | 50 |
| Benzol | 50 |
| Ethyl acetate | 50 |
| Melamine resin (non-volatile matter 70%) (trimethylol-melamine-butyl ether) | 225 |
| Yield of the product (non-volatile matter 64%) | 620 |

Putting pyrolignite of iron into crude lacquer, the lacquer is dehydrated as already described, which is then subject to condensation under heating with hexamethylenetetramine-tri-xylenol added thereto, to which then solvents such as naphtha, benzol and ethyl acetate are added, and then melamine resin is added and filtered at 60° C. to remove.

When textile fabrics, particularly fabrics woven from artificial fibers are printed with the material thus obtained, a quite beautiful black design can be displayed. However, after being printed the fabrics thus treated must be heated at 130° C. for 10 minutes.

(*m*) Example of black printing paste for textile fabrics—

| | Kg. |
|---|---|
| Crude lacquer (55% urushiol) | 230 |
| Pyrolignite of iron 18° Bé. | 96 |
| Formaline (37%) | 39.5 |
| 50% NaOH solution | 5 |
| Maleic linseed oil | 70 |
| Water | 100 |
| Xylol | 90 |
| Yield of the product (56% non-volatile matter) | 410 |

Pyrolignite of iron and formaldehyde are admixed to crude lacquer, dehydrated by heating and subjected to strong agitation after NaOH, maleic linseed oil, water and xylol being added.

Maleic linseed oil not only dries fast, but is also high in hydrophilic property as compared with the usual linseed oil and consequently is emulsified easily. This oil is used as a raw material for this reason.

Maleic linseed oil is obtained by adding a small amount of maleic acid to linseed oil and subjecting the mixture to ester-substitution under heating.

Further, in the preceding Example (*l*), an organic solvent is used; and the whole is in a true solution state whereas in the Example (*m*), the paste is emulsified with addition of water; when being used, it can be diluted with water.

In addition in the aforesaid Examples (*l*) and (*m*), the products obtained are resistant respectively to water, solvent and soap water; and beautiful black printed fabrics can be obtained by using those printing pastes.

Those pastes must be hardened by heating at about 130° C. for 10 minutes.

What I claim is:

1. Method for the manufacture of deep black coloring matter having iron urushiolate as its principal constituent, which comprises adding substantially one gram atom of iron to from one to three moles of urushiol, heating the resulting mixture at a temperature substantially within the range of 120° C. to 130° C., and recovering the reaction product.

2. The method of claim 1, wherein one mole of ferrous compound selected from the group consisting of iron hydroxide, iron powder and ferrous acetate is added to from one to two moles of urushiol.

3. The method of claim 1, wherein one mole of ferric compound is added to from one and a half to three moles of urushiol.

4. The method of claim 1, wherein the iron urushiolate is dissolved in a hydrocarbon solvent and filtered to remove impurities.

5. The method of claim 1, wherein an addition product of monohydric phenols and hexamethylene tetramine is added to the iron urushiolate and the reaction mixture is further heated at said temperature.

6. The method of claim 1, wherein the monohydric phenols are selected from the group consisting of phenol, cresol and xylenol.

7. The reaction product prepared in accordance with claim 1.

8. A deep black coloring matter which has iron urushiolate as its principal constituent, made by the process which comprises adding substantially one gram atom of iron to from one to three moles of urushiol, heating the resulting mixture at a temperature substantially within the range of 120° C. to 130° C., and recovering the iron urushiolate product.

No references cited.